United States Patent [19]
Thornton

[11] Patent Number: 5,188,512
[45] Date of Patent: Feb. 23, 1993

[54] HELICOPTER BLADE PITCH CONTROL SYSTEM

[76] Inventor: William S. Thornton, 204 Ella St., Lafayette, La. 70506

[21] Appl. No.: 712,948

[22] Filed: Jun. 10, 1991

[51] Int. Cl.[5] .............................................. B63H 3/00
[52] U.S. Cl. .................................. 416/112; 416/114; 416/149; 416/159; 416/162
[58] Field of Search ............. 416/147, 149, 150, 159, 416/162, 163, 164, 165, 112, 113, 114, 115, 116

[56] References Cited

U.S. PATENT DOCUMENTS

| | | | |
|---|---|---|---|
| 2,064,223 | 12/1936 | Rothenhoefer | 416/114 |
| 2,404,522 | 7/1946 | Nemeth | 416/114 |
| 2,410,545 | 11/1946 | Main | 416/114 |
| 2,437,165 | 3/1948 | Locke | 416/115 |
| 2,677,430 | 5/1954 | Prince | 416/114 |
| 3,026,740 | 3/1962 | Covert | 416/164 |

FOREIGN PATENT DOCUMENTS

| | | | |
|---|---|---|---|
| 1268833 | 6/1961 | France | 416/113 |
| 0013198 | 1/1983 | Japan | 416/162 |
| 306772 | 2/1929 | United Kingdom | 416/116 |
| 459380 | 1/1937 | United Kingdom | 416/113 |

Primary Examiner—Thomas E. Denion
Attorney, Agent, or Firm—Pravel, Gambrell, Hewitt, Kimball & Krieger

[57] ABSTRACT

A helicopter blade pitch control system allows blade pitch to be controlled with regard to the degree of rotational position of the blade with respect to the direction of travel and also the degree of pitch. The invention provides an improved arrangement wherein speed paddles attach to rotor blades can change in pitch around the circle of rotation of the blade and also the amount of pitch change can be adjustably changed by the pilot. The apparatus includes a cylindrical member surrounding the rotor of the helicopter and being static with respect thereto so that variable pitch speed paddles connected to and forming a part of the blade assembly and which carry rotating foot members track the upper surface of the cylindrical member changing the pitch of the blade as it moves through a 360 degree rotation. The pitch is maximized when the blade moves rearwardly with respect to the direction of travel and the pitch collapses to a horizontal pitch when the blade moves forwardly, in the same direction of travel as the craft.

7 Claims, 9 Drawing Sheets

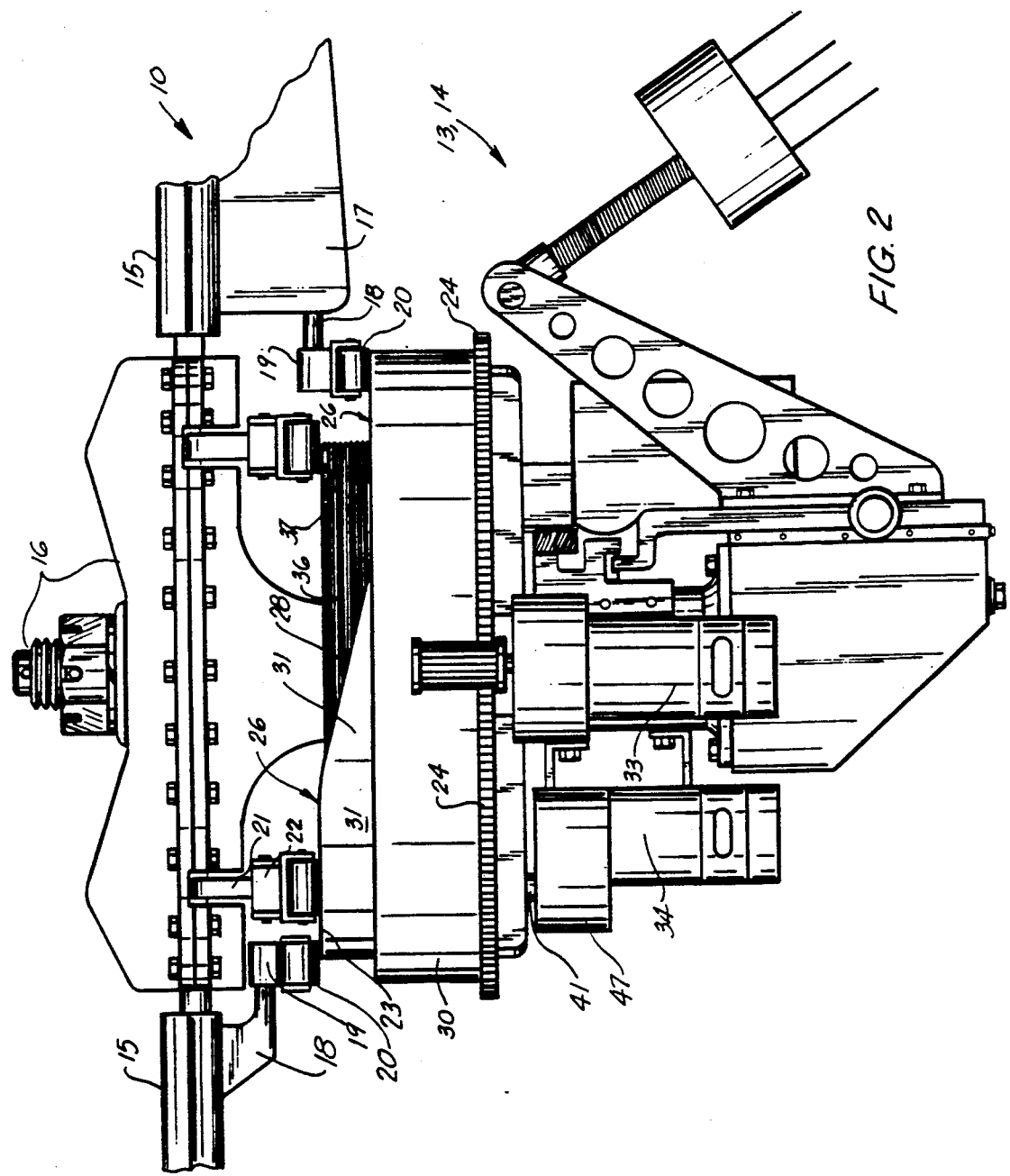

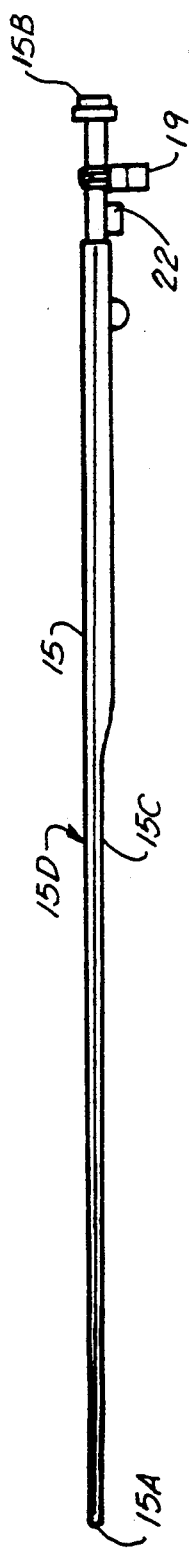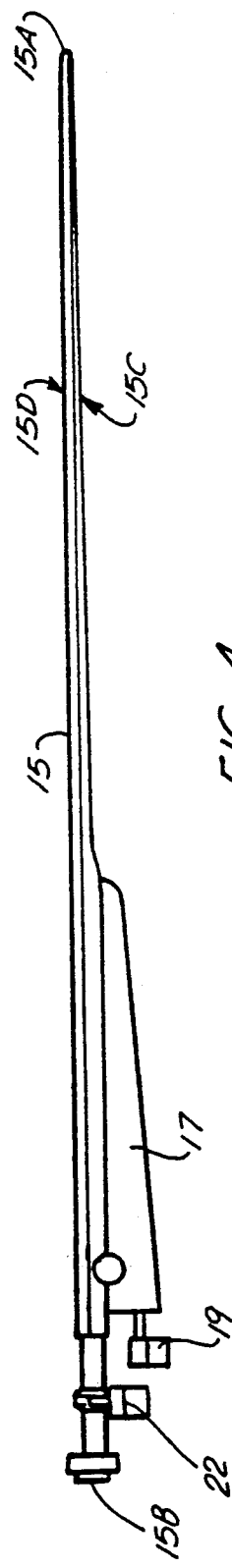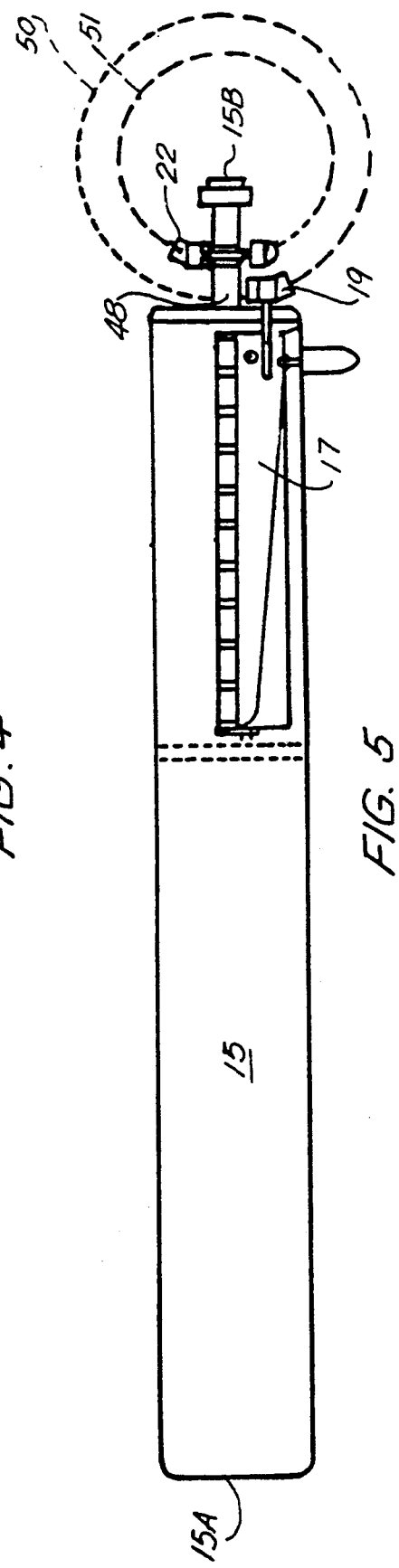

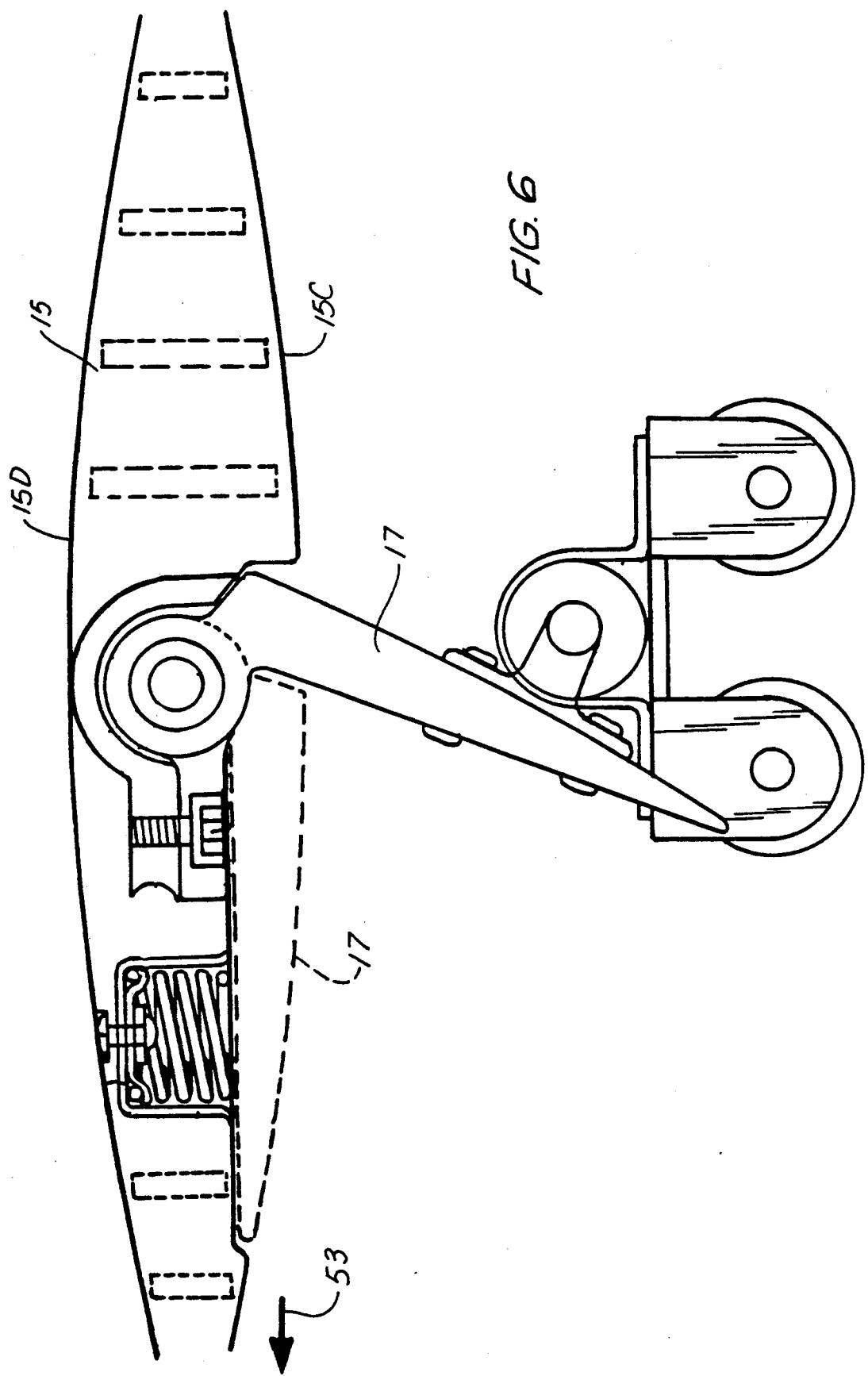

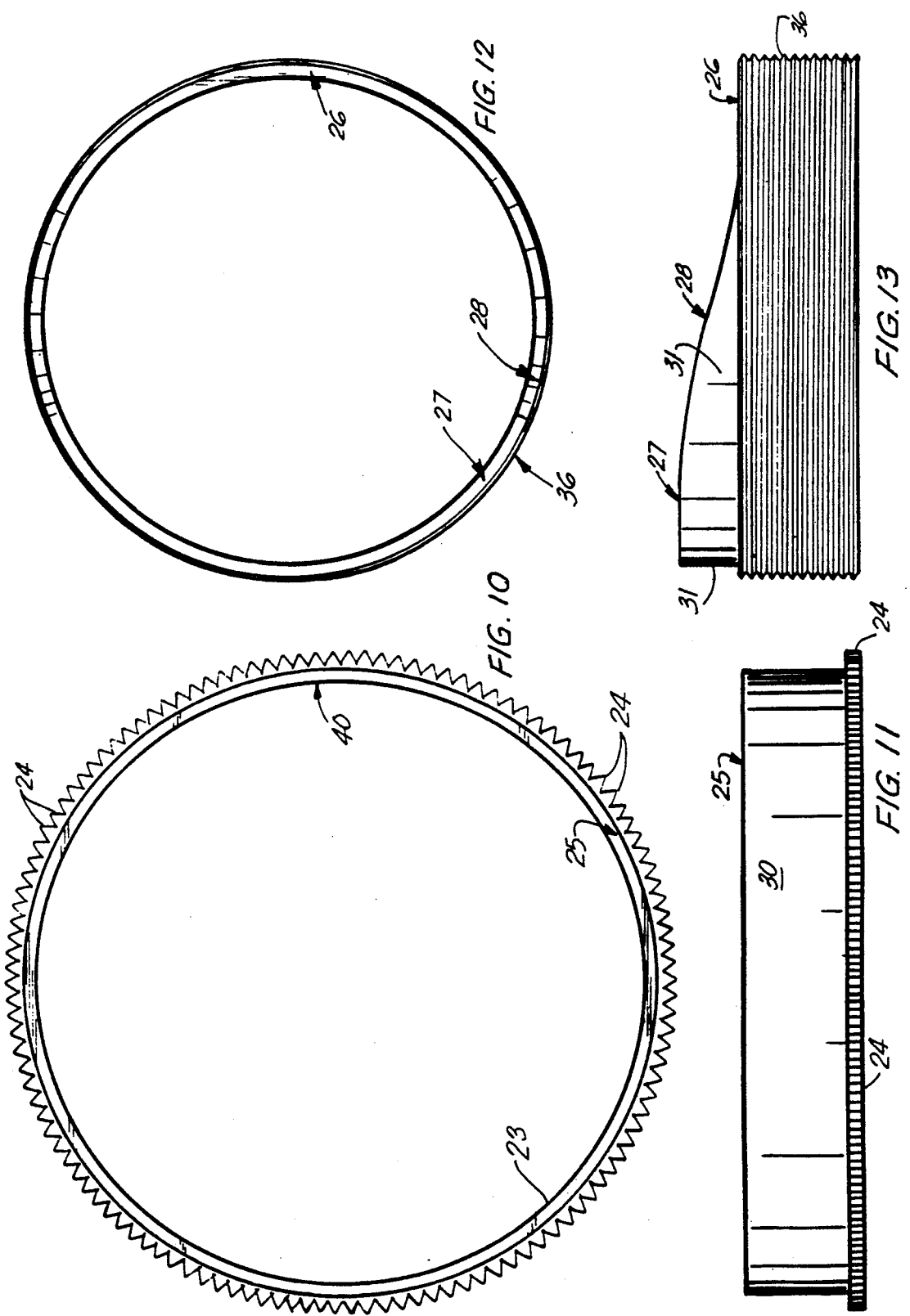

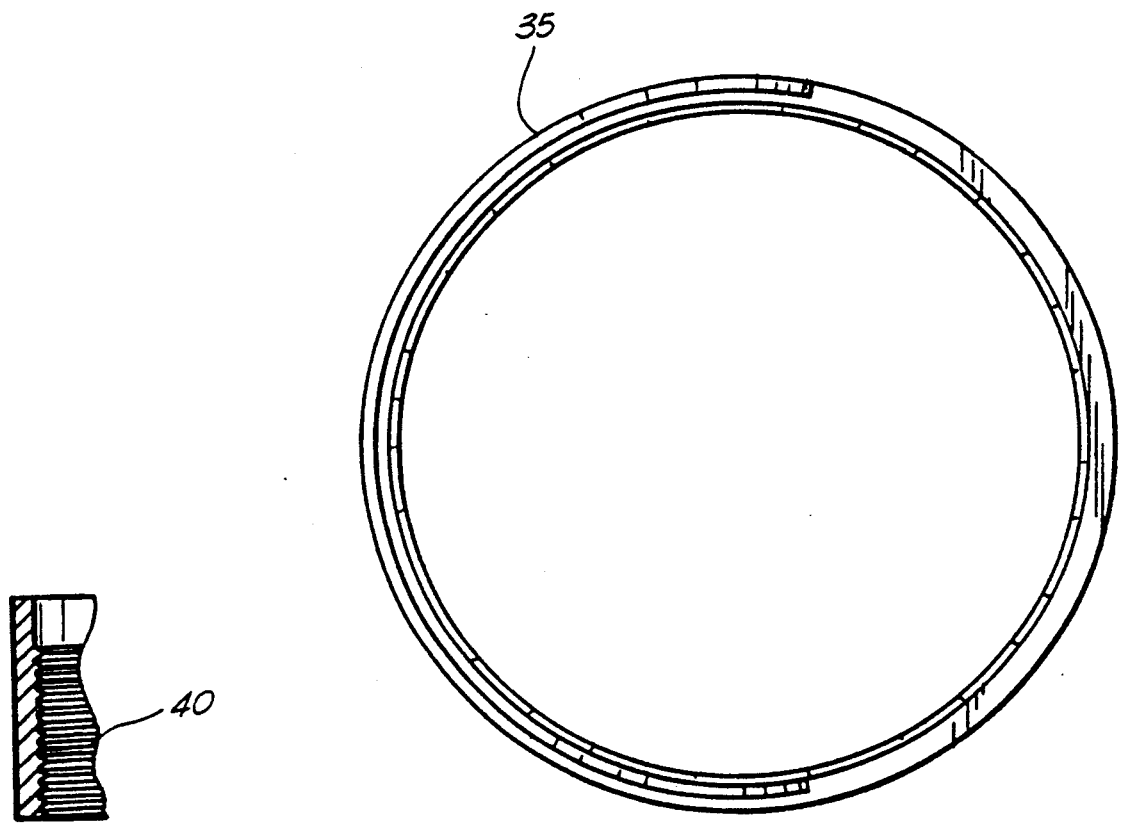
FIG. 16
FIG. 18
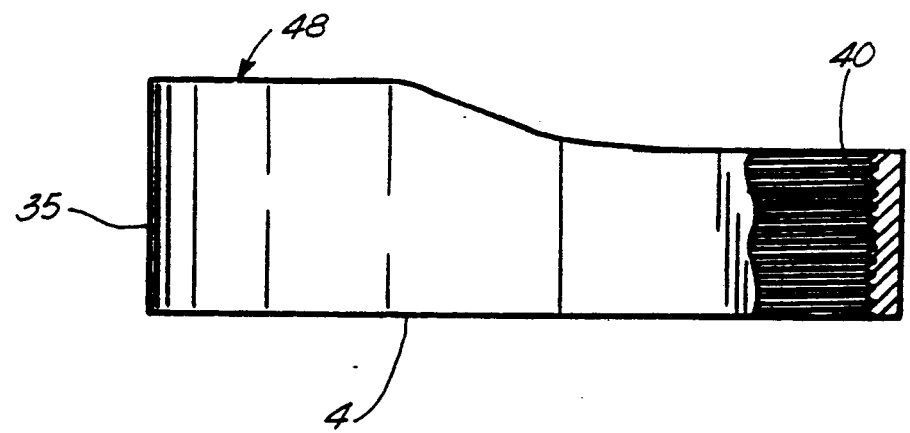
FIG. 17

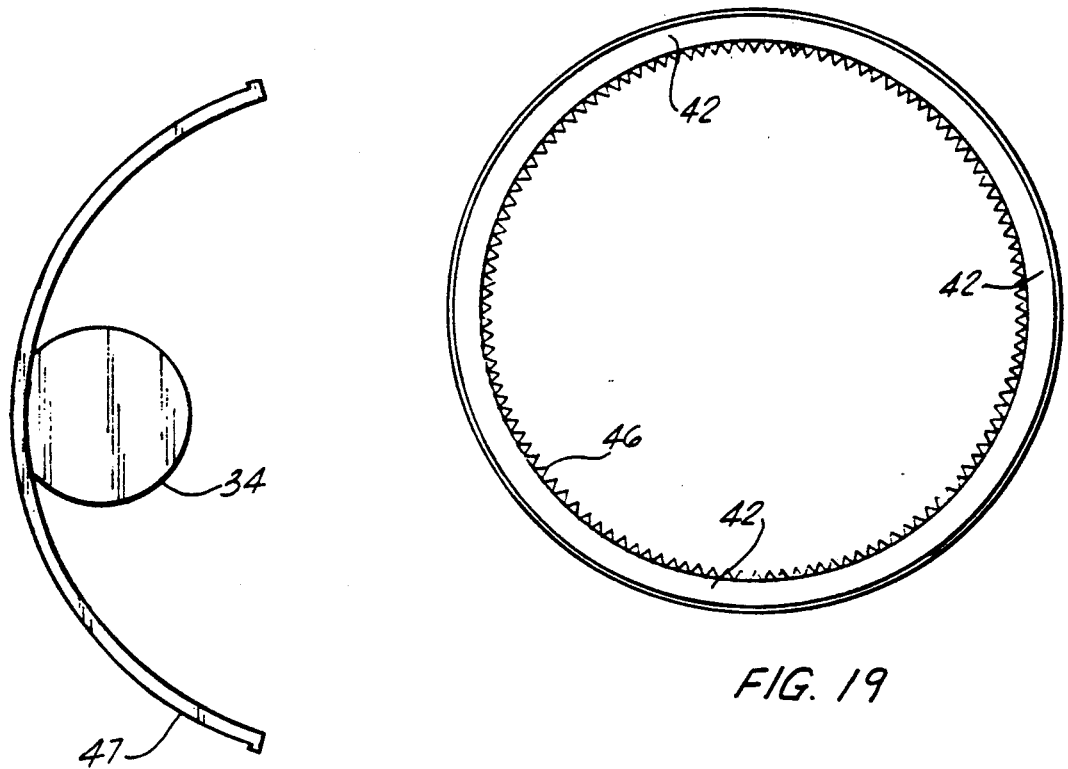
FIG. 21
FIG. 19
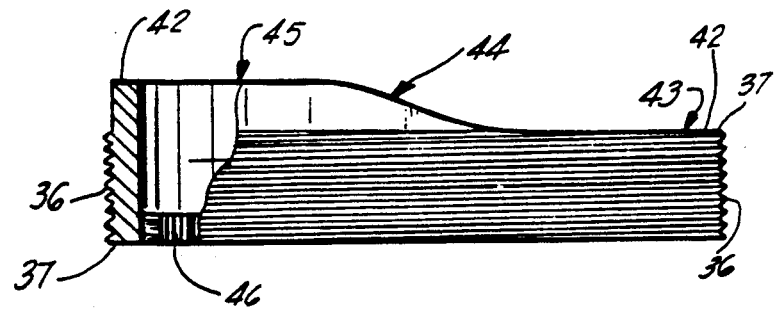
FIG. 20

HELICOPTER BLADE PITCH CONTROL SYSTEM

BACKGROUND OF THE INVENTION

1. Field Of The Invention

The present invention relates to helicopter blade construction and more particularly to an improved helicopter blade apparatus for controlling blade pitch wherein a variable elevation circumferential surface extending around the hub of the craft provides a roller surface that is engaged by roller members attached to a variable pitch flap portion of the helicopter blade. Blade pitch can be modified precisely with respect to the rotational position of the blade so that maximum bite is provided when the helicopter roller blade moves rearwardly with respect to the direction of travel. The flap portion is rotated downwardly, biting into the surrounding air as the blade moves rearwardly. The pitch is minimized and the blade flap, is rotated substantially flat when the blade moves forwardly, i.e. in the same direction as the direction of travel of the craft.

2. General Backoround

Helicopters can be single rotor or multiple rotor craft. A plurality of blades (eg. three to six) are rotatably mounted upon each rotor. The helicopter blade desirably maximizes bite with the surrounding air to increase speed and reduce fuel consumption. However, the present invention provides an improved helicopter blade pitch control apparatus that affords advantages over the prior art. Various issued patents relate to helicopter constructions and blade constructions. The following table lists various patented helicopter constructions.

TABLE I
PRIOR PATENTS

| PATENT NO. | INVENTOR | ISSUE DATE |
| --- | --- | --- |
| 2,372,481 | Gagas | 3-1945 |
| 2,389,798 | Main | 11-1945 |
| 2,443,393 | Landgraf | 6-1948 |
| 2,581,773 | Stalker | 1-1952 |
| 2,670,804 | Campbell | 3-1954 |
| 2,973,815 | Szyncer | 3-1961 |
| 4,669,958 | Peyran et al | 6-1987 |
| 2,456,485 | Bendix | 12-1948 |
| 2,404,522 | Nemeth | 7-1946 |
| 3,156,302 | Jordan | 1964 |
| 2,949,965 | De Tore et al | 1960 |
| 2,684,722 | Perry | 1954 |
| 2,494,217 | Watson | 1950 |
| 2,700,424 | Campbell | 1955 |
| 2,944,610 | Gluhareff | 1960 |
| 2,689,011 | Zakhartchenko | 1954 |
| 3,074,487 | Derschmidt | 1963 |
| 350,030 | Bruno et al (ITALY) | 7-1937 |
| 446,509 | Billing (GREAT BRITAIN) | 4-1936 |

SUMMARY OF THE PRESENT INVENTION

The present invention provides an improved helicopter blade pitch control apparatus that maximizes bite into the surrounding air when the blade travels rearwardly with respect to the direction of travel of the craft, and wherein the blade is substantially flat when the blade is advancing forwardly with respect to the direction of travel. The present invention thus provides a helicopter blade pitch control apparatus that selectively changes position of the helicopter blade in order to maximize propulsion and minimize drag.

The present invention provides an improved helicopter blade pitch control apparatus that includes a rotating hub having an axis of rotation and supporting multiple helicopter blades.

The plurality of blades each provide a blade axis that falls along a radial line extending from the center of rotation of the hub. Each blade provides an upper and lower surface with a portion that can pivot about the blade axis in order to change blade pitch, the rotating blades and their axes defining a blade plane of rotation.

A cylindrical runway extends around the center of rotation and includes a variable elevational surface. A tracking device is carried by each blade for changing blade pitch and includes rollers for engaging the runway. The elevational position of the variable elevation surface with respect to the blade plane of rotation is provided so that the degree of change of pitch can be selectively varied by the pilot of the craft.

In the preferred embodiment, the variable elevational surface is positioned below the plane of rotation of the blades.

In the preferred embodiment, the helicopter blade pitch control includes a carriage having multiple rollers thereon, and associated with each blade.

In the preferred embodiment, the elevational position of the variable elevational surface is changed by means of a pair of cylindrical members that are threadably engaged so that rotation of one of the cylindrical members with respect to the other causes one cylindrical member to move along the axis of rotation with respect to the other cylindrical member.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 2 is a fragmentary elevation view of the preferred embodiment of the apparatus of the present invention;

FIG. 3 is a fragmentary elevational view of the blade portion of the preferred embodiment of the apparatus of the present invention with blade pitch minimized;

FIG. 4 is a fragmentary elevational view of the preferred embodiment of the apparatus of the present invention illustrating the blade portion with pitch maximized;

FIG. 5 is a bottom fragmentary view of the preferred embodiment of the apparatus of the present invention illustrating a single blade;

FIG. 6 is a side fragmentary view of the preferred embodiment of the apparatus of the present invention illustrating a blade with maximum pitch and with minimum pitch in phantom lines;

FIGURE 10 is a top fragmentary view of the preferred embodiment of the apparatus of the present invention illustrating a cylindrical gear member; and FIGURE 11 is a side fragmentary view of the preferred embodiment of the apparatus of the present invention illustrating a cylindrical gear member.

FIGURE 12 is a top fragmentary view of a cylindrical member portion of the preferred embodiment of the apparatu of the present invention;

FIGURE 13 is a side view of the cylindrical member of FIG. 12;

FIG. 16 is a top fragmentary view of a cylindrical member used as part of the apparatus of the present invention;

FIG. 17 is a side view of the cylindrical member shown in FIG. 16;

FIGURE 18 is a fragmentary view illustrating the cylindrical member of FIGS. 16-17;

FIGURE 19 is a top fragmentary view illustrating a cylindrical gear member used as part of the apparatus of the present invention;

FIG. 20 is a side view illustrating the cylindrical member of FIG. 19; and

FIG. 21 is a fragmentary view illustrating a motor drive portion of the preferred embodiment of the apparatus of the present invention.

DETAILED DESCRIPTION OF THE PREFERRED EMBODIMENT

Figure 1:
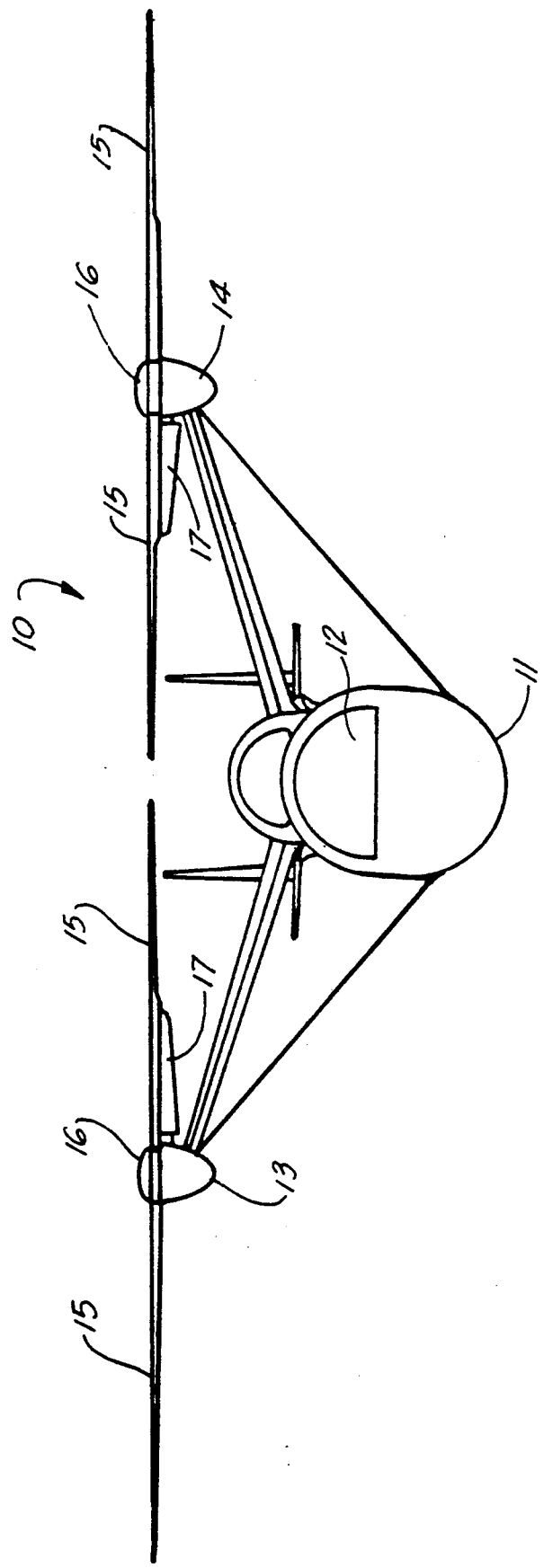
FIGURE 1 is a schematic front elevational view of the preferred embodiment of the apparatus of the present invention.
Figure 7:
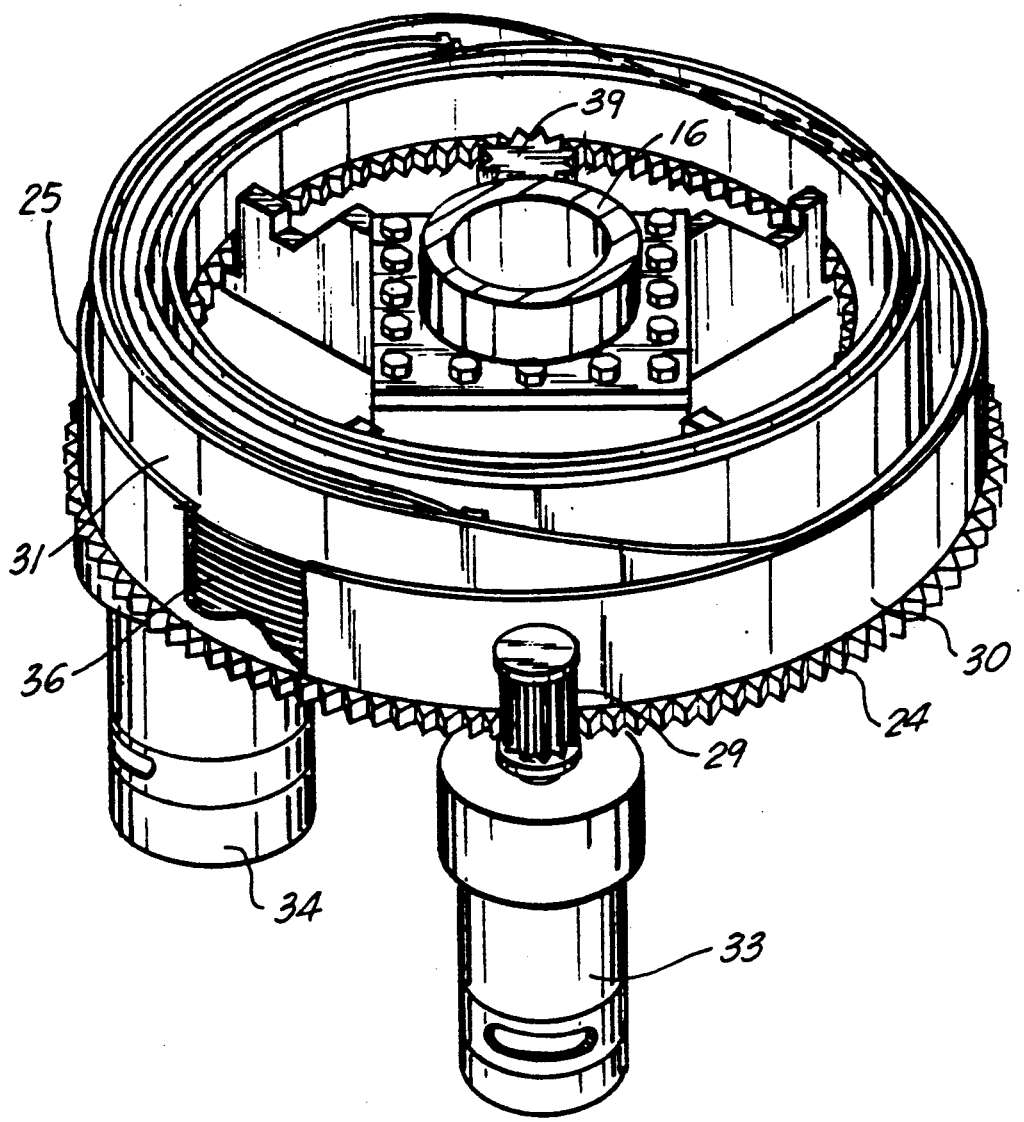
FIG. 7 is a perspective fragmentary view of the preferred embodiment of the apparatus of the present invention.
Figure 8:
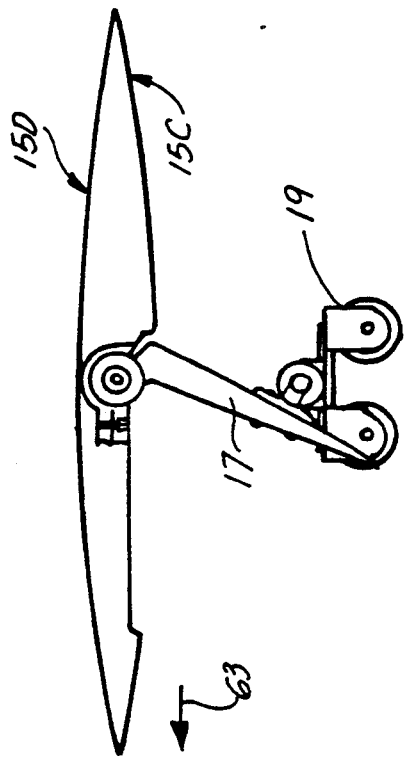
FIG. 8 is a side fragmentary view of the preferred embodiment of the apparatus of the present invention with minimum pitch illustrated.
Figure 9:
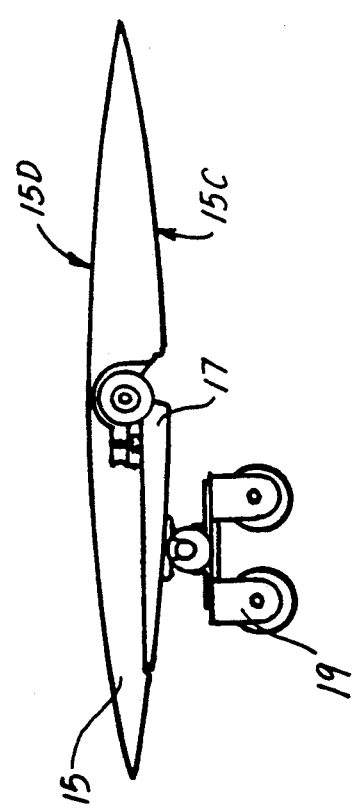
FIG. 9 is a side fragmentary view of the preferred embodiment of the apparatus of the present invention with maximum pitch illustrated.

FIGS. 1 and 2 illustrate generally the preferred embodiment of the apparatus of the present invention designated generally by the numeral 10. In FIG. 1, there can be seen helicopter apparatus 10 comprising a fuselage 11 with a cockpit 12 portion occupied by the pilot. In the embodiment of FIG. 10, a pair of spaced apart blade assemblies 13, 14 are provided each having a plurality of helicopter blades 15.

The blades 15 are rotatably mounted to the craft 10 upon hub 16 which rotates to define a central axis of rotation of the blades with respect to the craft 10. Each of the blades 15 has a central blade axis that falls along a radial line from the center of rotation of the hub 16, and each blade 15 provides upper and lower surfaces that can pivot about the blade axis to change blade pitch. In FIG. 2 for example, blades 15 show one blade on the right side of the drawing as having a trailing flap portion 17 pivoted downwardly changing the overall pitch of the blade 15, while the left side blade 15 in FIG. 2 is in a generally flat or horizontal orientation.

Each blade 15 carries a roller assembly 19 attached to the blade 15 by means of bracket 18. The roller assemblies 19 together with the members 30, 3i control the pitch of flap 17. Each roller assembly 19 includes one or more wheels or rollers 20 that are adapted to engage upper elevational surface 25 of cylindrical member 30. The cylindrical member 30 includes a flat upper annular surface 25. A second cylindrical member 31 has an upper surface 26, 27 of variable elevation with respect to horizontal including the lower elevational bearing surface 26 and the upper elevational bearing surface 27 as well as a transitional surface 28 which defines a ramp therebetween so that roller assemblies 19 can easily track surfaces 26, 27, 28. The cylindrical members 30, 31 are threadably engaged sot that rotation of member 30 with respect to member 31 causes the elevational position of the surfaces 26, 27, 28 to change with respect to roller assemblies 19. In the position of FIG. 2, member 30 is in its lowest position so that roller assemblies 19 track surfaces 26, 27 and 28. When member 30 rises, the roller assemblies 19 track the upper surface 25 of member 30 rather than the surface 26. Thus, the degree to which roller assembly 19 is lowered is variable. As member 30 rises with respect to member 31, maximum pitch charge is lowered. This can be controlled by the pilot by simply adjusting the elevational position of member 30.

The hub 16 provides a plurality of support rollers 22 having rollers or wheels 23 and attached to the hub assembly 16 at bracket 21. The cylindrical member 30 circumvents inner cylindrical member 31, covered with a plurality of external threads 36. The threads 36 engage female threads 40 on the inside surface of cylindrical member 31 which carries the variable elevation upper surface including the lowermost section 26, the transition or ramp section 27, and the uppermost high section 28. By rotating the cylindrical member 30, the member 31 moves upwardly or downwardly depending upon the direction of rotation to change the uppermost position of the variable elevational surfaces 26-28 and thus control the degree of up and down movement of wheeled roller assemblies 19 and also, the pitch of speed paddle 17. If the member 31 is elevated, the roller assembly 19 will not be able to drop to a lowermost position and thus the speed paddle 17 will only be partially lowered. Rotation of the member 30 controls the maximum pitch of the speed paddle 17. As shown in FIG. 1, the flap 17 is in a lowered position as the speed paddle 17 is moving rearwardly, taking the greatest possible bite in the air and maximizing speed of the craft 10 in a forward direction. However, when the flap is traveling forward, it collapses to the position shown in the left hand side of FIG. 2 wherein the speed paddle 17 is fully collapsed upon the blade 15.

The outermost cylindrical member 30 provides an annular toothed rack 24 that engages pinion gear 29 connected to motor drive 33. The pinion 29 is rotated in order to spin the member 30 with respect to the member 31, causing the member 31 to rise and fall depending upon the direction of rotation of the pinion 50. The member 31 is slidably affixed to the fuselage 11 so that it does not rotate, but can slide up and down when member 30 rotates. In this manner as aforementioned, the uppermost surface elevation of the member 31 is changed, and the degree of movement in an upward and downward direction of the roller 19 and its associated speed paddle 17 pitch is adjustably changed.

The position of the speed paddle 17 with respect to each helicopter blade 15 is further illustrated with respect to FIG. 6. In FIG. 6, the paddle 17 is in a fully collapsed position in phantom lines against the flat blade undersurface 15C. 15D indicates the upper flat surface of blade 15. 15A indicates the outermost tip spaced farthest from the hub 16 while the end portion 15B indicates the innermost end portion of blade 15 as attached to the hub structure 16. In FIG. 4, the io paddle i7 has been lowered to a downward most position which is the position assumed when the blade is rotating rearwardly and the flap 15 is gripping the surrounding air, thrusting the craft forward. In the bottom view of FIG. 5, rollers 19 and 22 are illustrated, the path of rotation of each roller 19, 22 respectively is illustrated, the roller 19 tracking upon a circular path designated by the numeral 50 in phantom lines and the roller 22 tracking a path designated by the numeral 51 in phantom lines.

In FIG. 6, blade 15 is illustrated and the paddle 17 shown in a lowermost position in hard lines and then an uppermost fully collapsed position in phantom lines. The direction of movement 53 of the blade 15 is illustrated by the arrow 53, that being the direction of movement of the blade when the paddle 17 is in its fully open position as when the blade 15 moves rearwardly and the paddle 17 bites into the surrounding air, thrusting the craft 10 forwardly. The collapsed position shown in phantom lines in FIG. 6 of paddle 17 illustrates a position when the blade is moving forwardly in the same direction of travel of the craft in which case resistance from the paddle 17 is undesirable.

Figure 14:
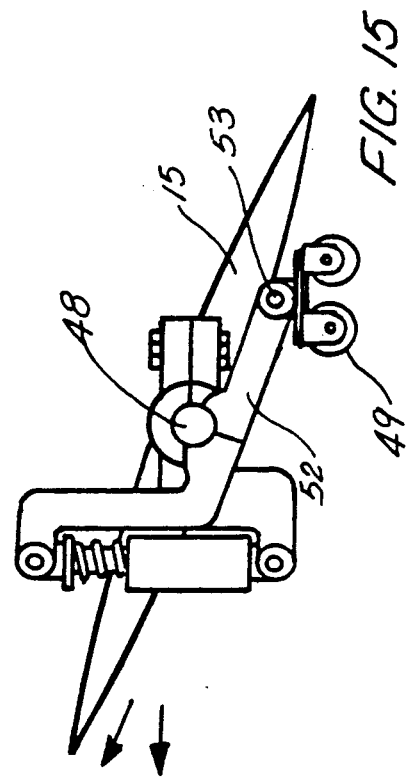
FIGURE 14 is a side fragmentary view of an alternate embodiment of the apparatus of the present invention illustrating the blade and roller assemblies with minimum pitch.
Figure 15:
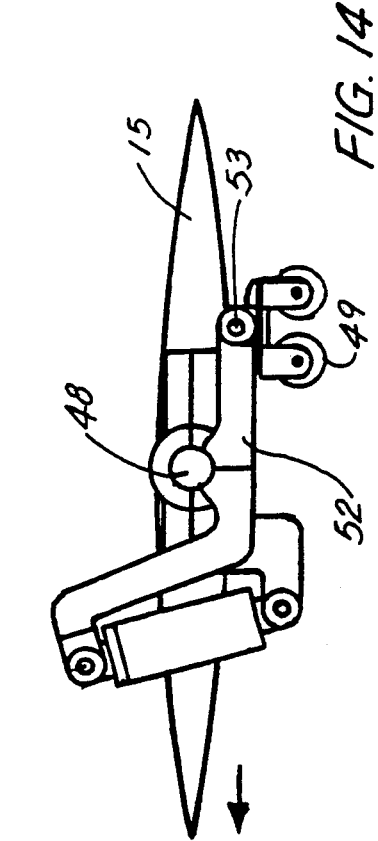
FIG. 15 is a side fragmentary view of the embodiment of FIG. 14 illustrating maximum pitch.

The path 60 of roller assembly 19 also defines the position of cylindrical members 30, 31. The path 51 defines the position of cylindrioal members 35, 37. Blade 15 attaches to blade shaft 48 to which roller assembly 22 is attached. (See FIGS. 3–5). Roller assembly 22 (FIGS. 14–15) includes arm 52 that defines a lever arm so that a shaft 48 and blade 15 rotate (See FIG. 15) when wheels 23 drop downwardly to surface 43 of cylindrical member 35. The members 35 and 37 are threadably engaged at threads 36, 40 and move up and down with respect to each other as is the case with members 30, 31. Upper surfaces 42 thus has a lowermost elevational level 43, transition level 44 and upper level 44. The pitch of blade 15 is controlled by the position of upper surface 42 relative to member 37. Motor drive 34 rotates member 37 by engaging internal teeth 36.

TABLE II

| Part Number | PARTS LIST Part Description |
|---|---|
| 10 | Helicopter apparatus |
| 11 | Fuselage |
| 12 | cockpit |
| 13 | Blade assembly |
| 14 | Blade assembly |
| 15 | Blade |
| 15A | Outer end of blade |
| 15B | Inner end of blade |
| 15C | Lower surface of blade |
| 15D | Upper surface of blade |
| 16 | Hub structure |
| 17 | Flap |
| 18 | Bracket |
| 19 | Roller assembly |
| 20 | Rollers |
| 21 | Bracket |
| 22 | Rollers |
| 23 | Wheels |
| 24 | Gear teeth |
| 25 | Upper surface |
| 26 | Lower elevational bearing surface |
| 27 | Upper elevational bearing surface |
| 28 | Transitional bearing surface |
| 29 | Pinion gear |
| 30 | Cylindrical member |
| 31 | Cylindrical member |
| 32 | Upper surface |
| 33 | Motor drive |
| 34 | Motor drive |
| 35 | Cylindrical member |
| 36 | Threads, external |
| 37 | Cylindrical member |
| 38 | Upper surface |
| 39 | Pinion idler |
| 40 | Threads, internal |
| 41 | Pinion gear |
| 42 | Upper surface |
| 43 | Lowermost elevation |
| 44 | Transitional elevation |
| 45 | Uppermost elevation |
| 46 | Teeth |
| 47 | Mounting bracket |
| 48 | Blade shaft |
| 49 | Roller Assembly |

TABLE II-continued

| Part Number | PARTS LIST Part Description |
|---|---|
| 50 | Roller path |
| 51 | Roller path |
| 52 | Roller arm |
| 53 | Pivotal Connection |

Because many varying and different embodimetns may be made within the scope of the inventive concept herein taught, and because many modifications may be made in the embodiments herein detailed in accordance with the descriptive requirement of the law, it is to be understood that the details herien are to be interpreted as illustrative and not in a limting sense.

What is claimed as invention is:

1. A helicopter blade pitch control apparatus comprising:
   a) rotating hub means having an axis of rotation and supporting multiple helicopter blades;
   b) a plurality of helicopter blades, each having a blade axis that falls along a radial line from the center of rotation of the hub means, each blade having a blade portion with upper and lower surfaces that can pivot about the blade axis to change blade pitch, the rotating blades and their axes defining a blade plane of rotation;
   c) cylindrical runway means extends around the center of rotation including a variable elevational surface;
   d) tracking means mounted on each blade for changing blade pitch and including roller means for engaging the runway means; and
   e) means for changing the elevation of the variable elevation surface relative to the blade plane of rotation and comprising a pair of cylindrically shaped member, threadably connected to one another so that rotation of one member with respect to the otehr causes a change in elevation of one member with respect to the other; and
   f) motor drive means for rotating one cylindrically shaped member with respect to the other during operation.

2. The apparatus of claim 1, wherein the variable elevation surface is positioned below the plane of rotation of the blades.

3. The helicopter blade pitch control apparatus of claim 1, wherien the blade tracking means comprises a carriage having multiple rollers thereon.

4. The helicopter blade pitch control apparatus in claim 1 further comprising a first plurality of wheeled supports extending downwardly from the rotating hub means and a second plurality of wheeled supports carried by the plurality of blades.

5. The helicopter blade pitch control apparatus of claim wherein one of the cylindrically shaped members has a variable elevation upper surface defining a load transfer surface.

6. The helicopter blade pitch control apparatus of claim 1 further comprising a first plurality of wheeled supports carried by the hub means, a second plurality of wheeled supports carried by the plurality of blades, and the second plurality of wheeled supports tracks the variable elevation surface so that pitch of each helicopter blade changes as the associated wheeled support engages changes in elevation of the variable elevation surface.

7. The helicopter blade pitch control apparatus of claim 1 further comprising a plurality of wheeled supports attached respectively to the plurality of helicopter blades at a position that is offset from each blade axis so that each wheeled support can rotate about the blade axis.

* * * * *